US00RE44332E

(19) United States
(12) Reissued Patent
Mailandt et al.

(10) Patent Number: US RE44,332 E
(45) Date of Reissued Patent: Jul. 2, 2013

(54) ELECTRICALLY VARIABLE BEAM TILT ANTENNA

(75) Inventors: Peter Mailandt, Dallas, TX (US); Tan Huynh, Hurst, TX (US)

(73) Assignee: Andrew LLC, Hickory, NC (US)

(21) Appl. No.: 10/747,818

(22) Filed: Dec. 29, 2003

Related U.S. Patent Documents

Reissue of:
(64) Patent No.: 5,917,455
Issued: Jun. 29, 1999
Appl. No.: 08/747,627
Filed: Nov. 13, 1996

(51) Int. Cl.
*H01Q 11/10* (2006.01)

(52) U.S. Cl.
USPC ..... 343/792.5; 343/795; 343/853; 333/161

(58) Field of Classification Search
USPC ..... 343/700 MS, 792.5, 795, 853; 333/159, 333/161; 342/371, 372, 374
See application file for complete search history.

(56) References Cited

U.S. PATENT DOCUMENTS

| | | | | |
|---|---|---|---|---|
| 2,968,808 | A | 1/1961 | Russell | |
| 3,110,030 | A | 11/1963 | Cole | |
| 3,193,831 | A | 7/1965 | Yang | |
| 4,203,118 | A | 5/1980 | Alford | |
| 4,241,352 | A | 12/1980 | Alspaugh et al. | |
| 4,788,515 | A | 11/1988 | Wong et al. | |
| 5,184,140 | A | 2/1993 | Hariu et al. | |
| 5,187,455 | A | 2/1993 | Mandai et al. | |
| 5,281,974 | A | 1/1994 | Kuramoto et al. | |
| 5,440,318 | A | 8/1995 | Butland et al. | |
| 5,488,737 | A | 1/1996 | Harbin et al. | |
| 5,512,914 | A | 4/1996 | Hadzoglou et al. | |
| 5,551,060 | A | 8/1996 | Fujii et al. | |
| 5,617,103 | A | 4/1997 | Koscica et al. | |
| 5,801,600 | A | 9/1998 | Butland et al. | |
| 5,805,996 | A | 9/1998 | Salmela | |
| 5,818,385 | A | 10/1998 | Bartholomew | |
| 6,198,458 | B1 | 3/2001 | Heinz et al. | |
| 6,573,875 | B2 * | 6/2003 | Zimmerman et al. | 343/853 |
| 6,987,487 | B2 * | 1/2006 | Zimmerman et al. | 343/757 |
| 2002/0126059 | A1 * | 9/2002 | Zimmerman et al. | 343/757 |
| 2002/0135524 | A1 * | 9/2002 | Zimmerman et al. | 343/760 |

FOREIGN PATENT DOCUMENTS

| | | | |
|---|---|---|---|
| AU | 656857 | 7/1993 | |
| AU | B-41625/93 | 1/1994 | |
| JP | 63-6906 | 1/1988 | 343/853 |
| JP | 5-121915 | 5/1993 | |
| JP | 06-326501 | 11/1994 | |
| JP | 08047043 A | 2/1996 | |

OTHER PUBLICATIONS

Variable Electron Beam—Aerial System for 1½ meters, Journal IEEE, Part IIIA, vol. 93,1946, Bacon, G. E.

* cited by examiner

*Primary Examiner* — Tan Ho
(74) *Attorney, Agent, or Firm* — Husch Blackwell LLP

(57) ABSTRACT

An antenna assembly having an operating frequency and a vertical radiation pattern with a main lobe axis defining a downtilt angle with respect to the earth's surface. The antenna assembly comprises a plurality of antennas in first, second, and third antenna groups *physically* disposed along a backplane, the backplane having a longitudinal axis along which the antennas are disposed, and a phase adjustment mechanism [disposed] *electrically connected* between the [second] *first* and third antenna groups, such that adjustment of the phase adjustment mechanism results in variation of the vertical radiation pattern downtilt angle.

56 Claims, 7 Drawing Sheets

ELECTRICALLY VARIABLE BEAM TILT ANTENNA

Matter enclosed in heavy brackets [ ] appears in the original patent but forms no part of this reissue specification; matter printed in italics indicates the additions made by reissue.

FIELD OF THE INVENTION

This invention relates generally to antennas and in particular to antennas having variable radiation patterns, and is more particularly directed toward an antenna in which the vertical radiation pattern downtilt angle is electrically variable.

BACKGROUND OF THE INVENTION

RF (radio frequency) communication systems that act to maximize spectrum efficiency through frequency reuse include cellular radiotelephone systems, some types of trunked communication systems, among others. A common feature that these systems generally share is the division of a service area into smaller areas known as "cells."

Within each cell, a group of relatively low power base stations provides RF communication services to subscribers within that cell over a group of RF channels. Because of the low power, the same group of RF channels may be reused only a short distance away to provide communication services to subscribers in another (although not generally adjacent) cell.

Although offering distinct advantages in terms of spectrum efficiency, a system of the type just described demands considerable investment in infrastructure. Because of the relatively small cell size, a large number of cells may be required to provide adequate service over a large coverage area, and each cell requires a number of base stations, a controller, and an antenna system.

The type of antenna system selected for use within a cell is important both for maximizing system efficiency and for effectively tailoring system operation for particular categories of users. In many systems, each cell is further divided into sectors, multiplying at least the receive antenna requirement for the cell by the number of sectors selected. In a commonly used configuration, each cell is divided into six equal sectors, with each sector having its own directional receive antenna with a radiation pattern closely approximating the sector shape. A single transmit antenna having an omnidirectional radiation pattern is used for transmission into all sectors of the cell.

In other cell configurations, the cell may be divided into sectors for transmitting, as well. This type of system is useful for dealing with cells having irregular boundaries caused, for example, by natural or man-made obstructions. Omnidirectional transmit patterns, in contrast, are most often employed where the desired coverage pattern is approximately circular in shape.

Naturally, antenna systems used in sectored cells are directional antennas. Although the radiation patterns of these antennas are selected to approximate the sector shape, the patterns are not generally easy to alter after installation. A need to alter the radiation pattern may arise based upon studies of system performance, newly constructed obstacles to RF propagation, altering of the shapes of adjacent cells, or for a variety of other reasons.

It may even be required that cell boundaries be altered as a function of time. During periods of relatively low usage, in the evenings and on weekends and holidays, for example, overlapping coverage areas can be created by extending the radiation patterns of the antennas slightly into adjacent cells. This increases the number of channels available to users in the overlap areas, and minimizes the need for hand-offs, but it also increases the likelihood that co-channel interference may occur. During peak periods, when many channels are in use providing service to a relatively large number of users, the radiation patterns should be restored to a state that minimizes adjacent cell overlap.

Of course, extension of radiation patterns can be done with power control, but increasing the power of the RF signals transmitted by the antenna directly impacts the likelihood of undesired interference. Another way of altering antenna radiation patterns is to physically move the antennas themselves, but this is difficult to do after initial installation. It is possible, of course, to provide a mechanism to alter an antenna's azimuth and elevation, much the same way a radar antenna is moved, but such mechanisms are expensive, and the mechanical linkages required to support such movement would degrade the structural integrity of the antenna mounting system.

Accordingly, a need arises for an antenna system that provides an economical and easily manipulated adjustment to its radiation pattern without compromising the integrity of its mechanical mounting structure.

SUMMARY OF THE INVENTION

These needs and others are satisfied by the antenna assembly of the present invention, having an operating frequency and a vertical radiation pattern with a main lobe axis defining a downtilt angle with respect to the earth's surface. The antenna assembly comprises a plurality of antenna means in first, second, and third antenna groups disposed along a backplane, the backplane having a longitudinal axis along which the antenna means are disposed, and a phase adjustment means [disposed] *electrically connected* between the [second] *first* and third antenna groups, such that adjustment of the phase adjustment means results in variation of the vertical radiation pattern downtilt angle. The second and third antenna groups each comprise a plurality of antenna means. The first antenna group comprises one antenna means, and the second and third antenna groups each comprises two antenna means.

In one form of the invention, each of the antenna means comprises a log-periodic dipole array. Each of the log-periodic dipole array antennas comprises generally complementary front and rear dipole sections wherein one arm of each dipole is provided by the front dipole section, and the opposing arm of each dipole is provided by the rear dipole section. The backplane may be a plate of conductive material, substantially perpendicular to the earth's surface.

In another aspect of the invention, the phase adjustment means comprises input coupling means, movable coupling means having a pivotally mounted first end electromagnetically coupled to the input coupling means, and transmission line means electromagnetically coupled to a second end of the movable coupling means. Drive means, which may comprise an electric motor, may be coupled to the movable coupling element. The drive means may be operable from a remote location, and may include means for transmitting position information relating to the phase adjustment means to the remote location.

The transmission line means may be a semicircular, air-substrated transmission line section having opposing ends coupled to antenna feeder cables. The input coupling means may comprise an input coupling element formed in a T-shape from a plate of conductive material, and coupled to an antenna assembly cable, and the antenna feeder cables may be coupled to power dividers. Each of the power dividers may be a microstrip transformer fabricated on a substrate of low-loss dielectric material.

A first power divider is coupled to the input coupling element of the phase adjusting means and to a second power divider having a plurality of outputs, each output coupled to an antenna means of the second antenna group. The phase adjustment means has a range of adjustment including a minimum downtilt position, a mid-point, and a maximum downtilt position, and electrical path lengths at the operating frequency, from the input coupling element to each of the antenna means, are selected to define a progressive phase shift between each of the antenna means such that, with the phase adjustment means set at its mid-point, the vertical radiation pattern downtilt angle is approximately 7 degrees.

The vertical radiation pattern downtilt angle is approximately zero degrees with the phase adjustment means set at the minimum downtilt position, and the vertical radiation pattern downtilt angle is approximately 14 degrees with the phase adjustment means set at the maximum downtilt position.

Further objects, features, and advantages of the present invention will become apparent from the following description and drawings.

BRIEF DESCRIPTION OF THE DRAWINGS

FIG. 8b is an end view of the antenna assembly of FIG. 8a;

DETAILED DESCRIPTION OF THE INVENTION

In accordance with the present invention, an electrically variable beam tilt antenna is described that provides distinct advantages when compared to systems of the prior art. The invention can best be understood with reference to the accompanying drawing figures.

Figure 1:
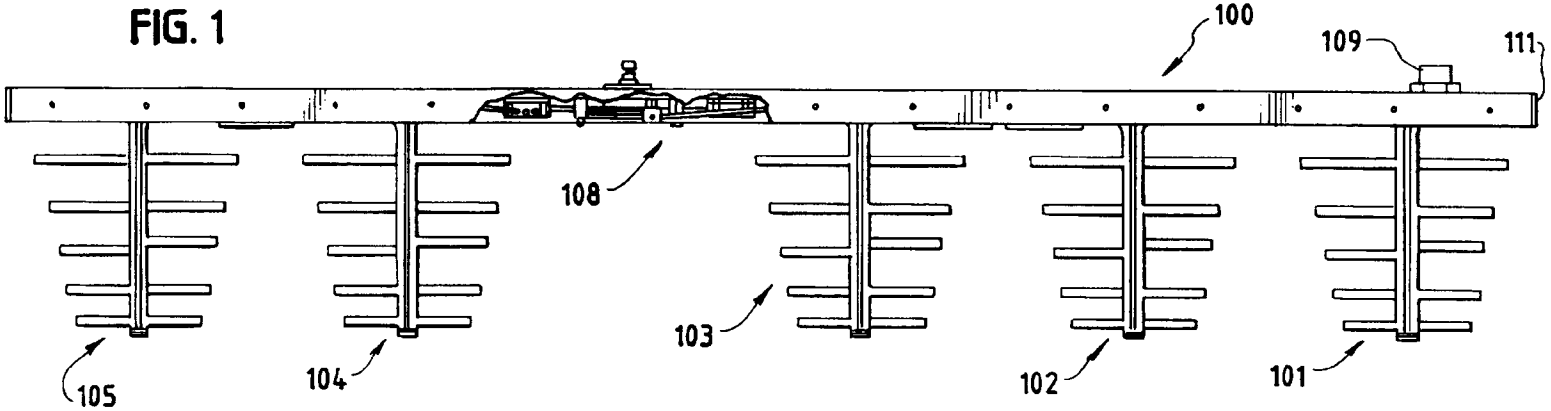
FIG. 1 is a side view of an antenna assembly in accordance with the present invention.
Figure 2:
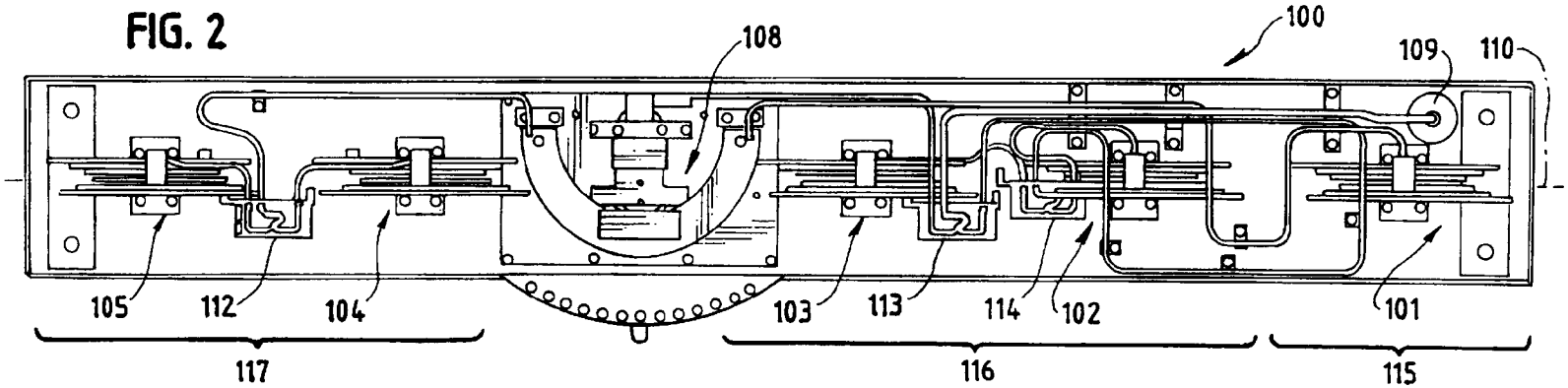
FIG. 2 is a front plan view of the antenna assembly of FIG. 1.

FIGS. 1 and 2 are side and front views, respectively, of an antenna assembly 100 in accordance with the present invention. The antenna assembly 100 comprises a plurality of antenna means such as antennas 101-105 arranged as first, second, and third antenna groups 115, 116, and 117. Antenna 101 alone forms the first antenna group 115, while antennas 102 and 103 form the second antenna group 116, and antennas 104 and 105 form the third antenna group 117. Phase adjustment means, such as a phase adjustment mechanism 108, is disposed between the [second] *first* and third antenna groups [116] *115*, 117. Operation and effect of the phase adjustment mechanism 108 will be discussed in detail subsequently.

As can be appreciated more readily from an examination of the side view of FIG. 1 in conjunction with FIG. 2, each of the antennas 101-105 is mounted along the longitudinal axis 110 of a conductive backplane 111. Preferably, the conductive backplane is an aluminum extrusion, although any conductive plate of sufficient strength to provide support for the antennas 101-105 would serve. The material selected should be relatively light in weight, however, so that the completed antenna assembly will not be unwieldy.

Figure 11:
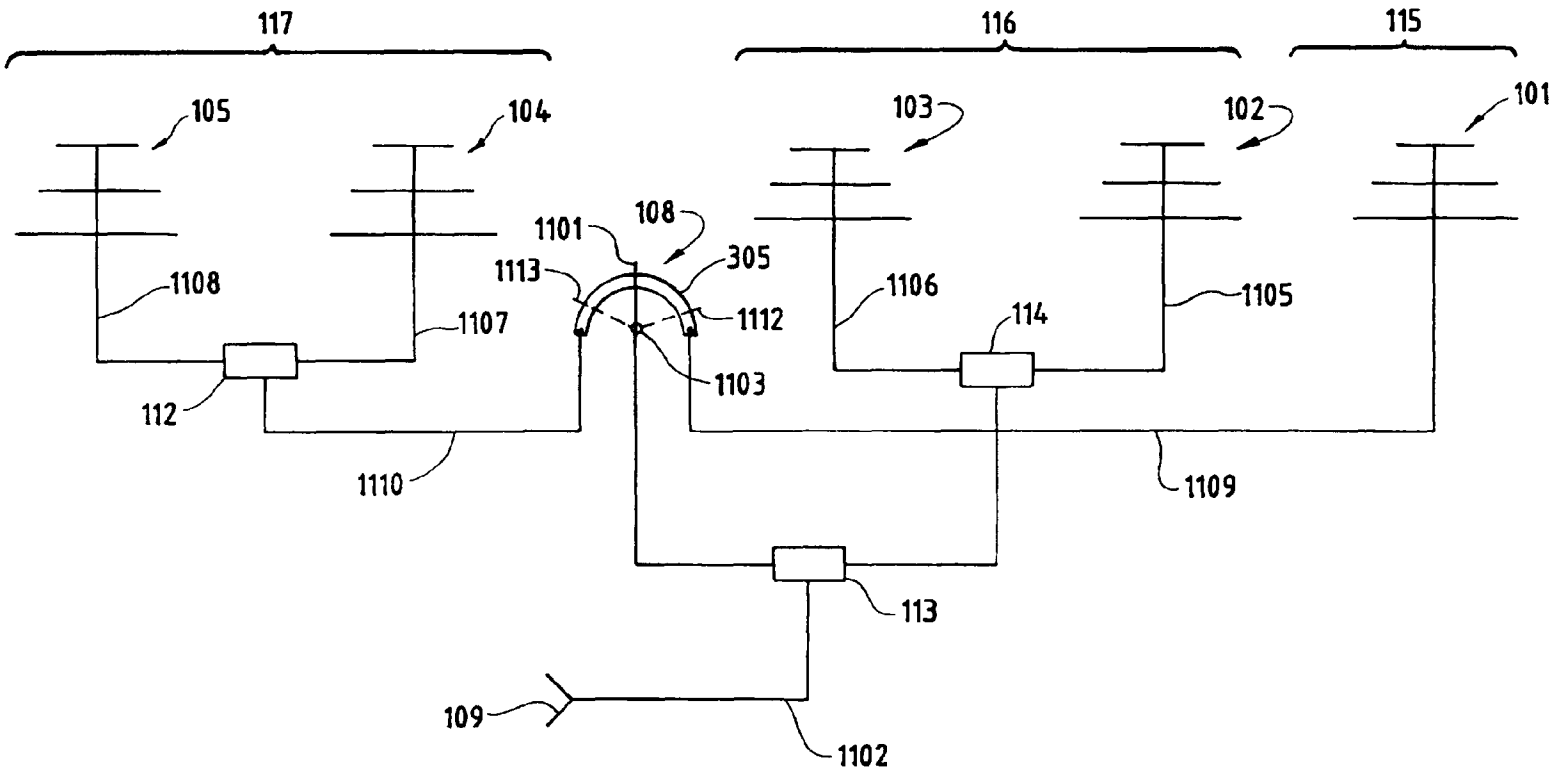
FIG. 11 is a schematic representation of the antenna assembly of FIG. 1.

The backplane 111 also provides a mounting surface for an RF connector 109, the phase adjustment mechanism 108, and a plurality of dielectric-substrated microstrip transformers 112-114 used as power dividers, and the transmission lines that interconnect the antenna assembly components (1105-1110 in FIG. 11). These elements will be discussed in more detail below.

Figure 7:
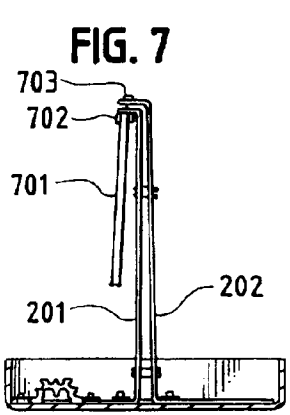
FIG. 7 is a side view of the dipole array sections of FIGS. 6a and 6b in confronting relationship.
Figure 6B:
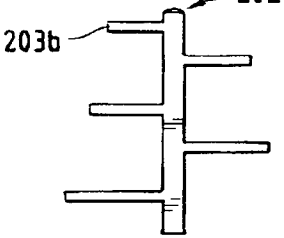
FIGS. 6a and 6b depict front and rear log-periodic dipole array sections.
Figure 6A:
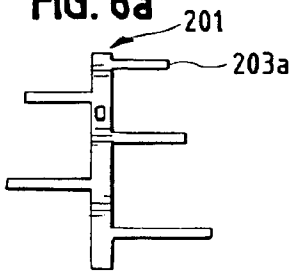

The antenna assembly 100 includes five individual, log-periodic dipole array (LPDA) antennas 101-105, the design of which is generally well-known in the art. The particular configuration used in the preferred embodiment of the invention is illustrated in FIGS. 6a, 6b, and 7. The LPDA antennas 101-105 are formed from two confronting conductive sections 201, 202. The sections are generally complementary in shape, with the shorter front section 201 having one arm 203A of a particular dipole antenna, and the somewhat taller rear section 202 having the other arm 203B of the same dipole.

As can be appreciated from an examination of FIG. 7, the two sections 201, 202 are mounted in confronting relationship, with the upper portions of each section bent over at a 9 degree angle. This allows a coaxial cable 701 to be connected to the appropriate elements of the completed LPDA. The shield 702 is soldered to the front section 201, while the center conductor of the coaxial cable 701 is soldered to the rear section 202.

Figure 8B:
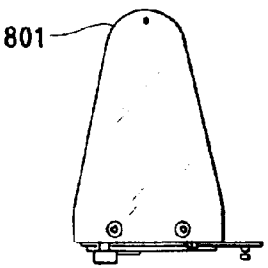
Figure 8A:
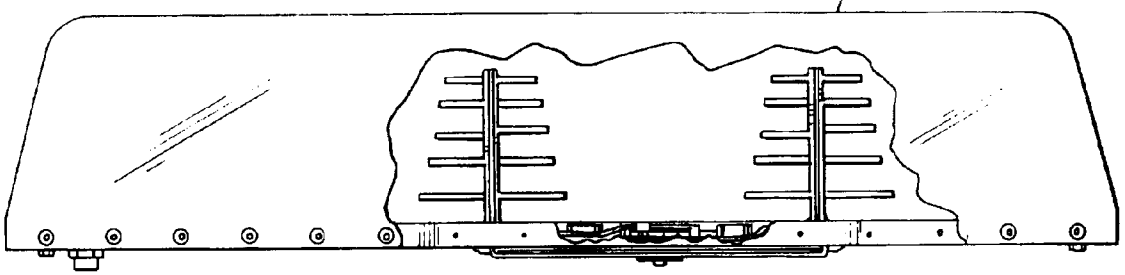
FIG. 8a is a side view of an antenna assembly in accordance with the present invention with a radome in place.

FIGS. 8a and 8b illustrate an antenna assembly 100 of the present invention with a protective radome 801 attached. The radome 801 may be of plastic or fiberglass construction, for example.

Figure 3:
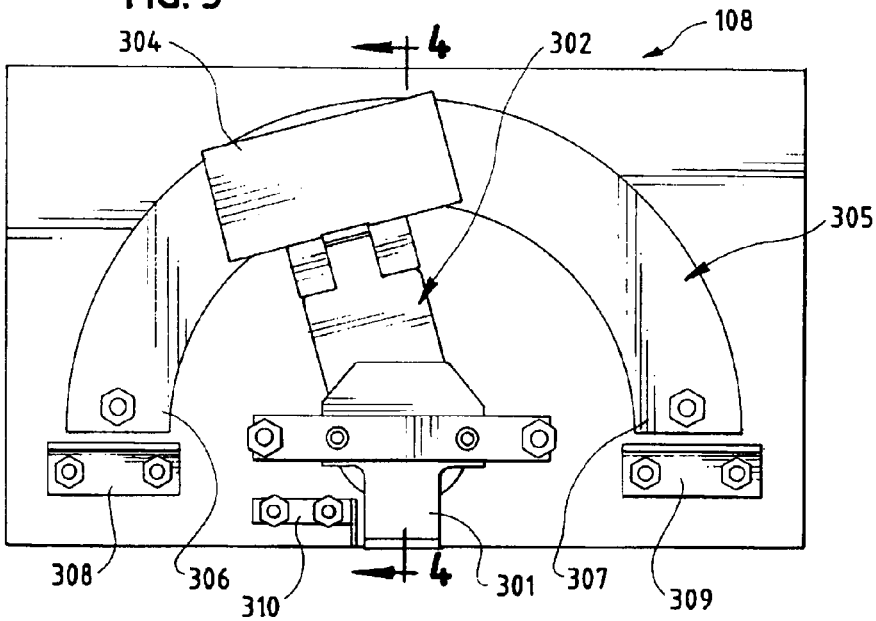
FIG. 3 is a front view of a phase adjustment mechanism in accordance with the present invention.
Figure 4:
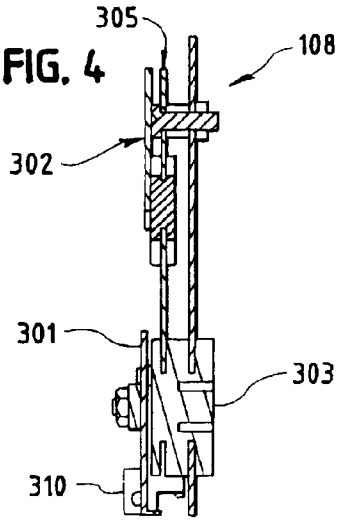
FIG. 4 is a section view taken along section lines 4-4 of FIG. 3.
Figure 5:
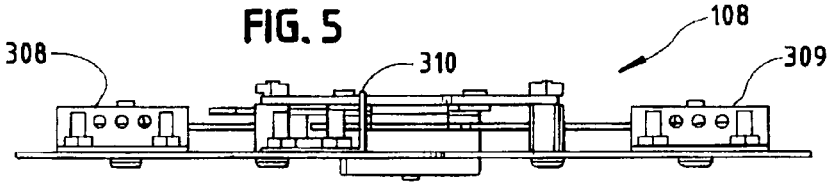
FIG. 5 is a side view of the phase adjustment mechanism of FIG. 3.

The phase adjustment mechanism 108, illustrated in FIGS. 3 through 5, includes input coupling means such as an input coupling element 301 formed in a T-shape from a plate of conductive material. Preferably, the input coupling element 301 is formed from a sheet of 0.062 inch half-hard brass.

The input coupling element 301 is electromagnetically coupled to movable coupling means, such as a movable coupling section 302, which is fixed near a first end to a pivot point 303. The movable coupling section 302 is also preferably formed from a sheet of 0.062 inch half-hard brass. The second end of the movable coupling section 302 terminates in a conductive plate 304 that is electromagnetically coupled to transmission line means, such as a semicircular, air-substrated transmission line section 305. Preferably, the conductive plate 304 is an integrally formed part of the movable coupling section 302.

The semicircular transmission line section 305, which is also preferably formed from 0.062 inch half-hard brass sheet stock, has first and second opposed end portions 306, 307 from which antenna feeder cables (1109, 1110 in FIG. 11) direct RF signals, having a desired phase relationship, to the first and third antenna groups 115, 117 of the antenna assembly 100. The second antenna group 116 is fed from a transformer 113 that divides the antenna input signal between the input coupling element 1101 of the phase adjustment mechanism 108 and the second antenna group 116.

Ground connection brackets 308, 309 are provided near the respective opposed end portions 306, 307 for attachment of the shield portions of the antenna feeder cables. A similar ground bracket 310 is provided near the input coupling element 301 for attachment of the shield of an antenna assembly cable (1102 in FIG. 11).

From one of the opposing ends 307 of the semicircular transmission line section 305, a first antenna feeder cable (1109 in FIG. 11) couples RF signals to the first antenna group 115. Since there is only one antenna 101 in this group in the preferred embodiment, no transformer or power divider is necessary. A power divider 113 divides input power between the input coupling element 1101 of the phase adjustment mechanism and a power divider 114 that feed the second antenna group 116. A third power divider 112 has two outputs; one for each of the antennas 104, 105 in the third antenna group 117. Each of the antennas 101-105 has a fifty ohm input impedance. An antenna output cable (1105-1108 in FIG. 11) couples RF power to each of the antennas 102-105).

Figure 9:
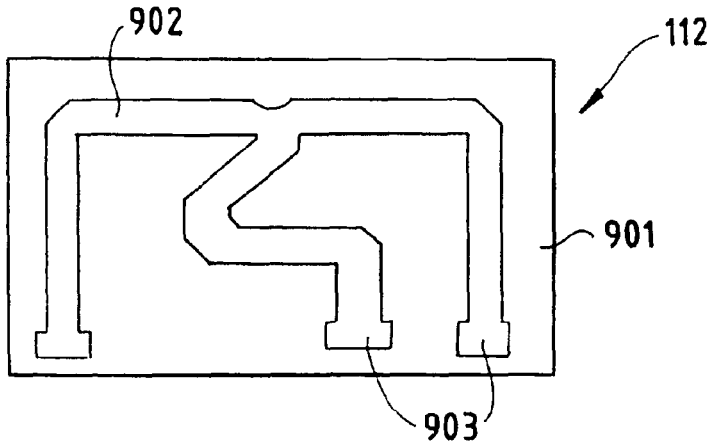
FIG. 9 is a plan view of a dielectric-substrated microstrip transformer.

Power divider 112, illustrated in FIG. 9, is a dielectric-substrated microstrip transformer, formed by etching unwanted copper from a copper coated substrate 901 of low-loss dielectric material to leave microstrip transmission line sections 902 terminated in contact pads 903 to accommodate coaxial transmission lines.

Figure 10:
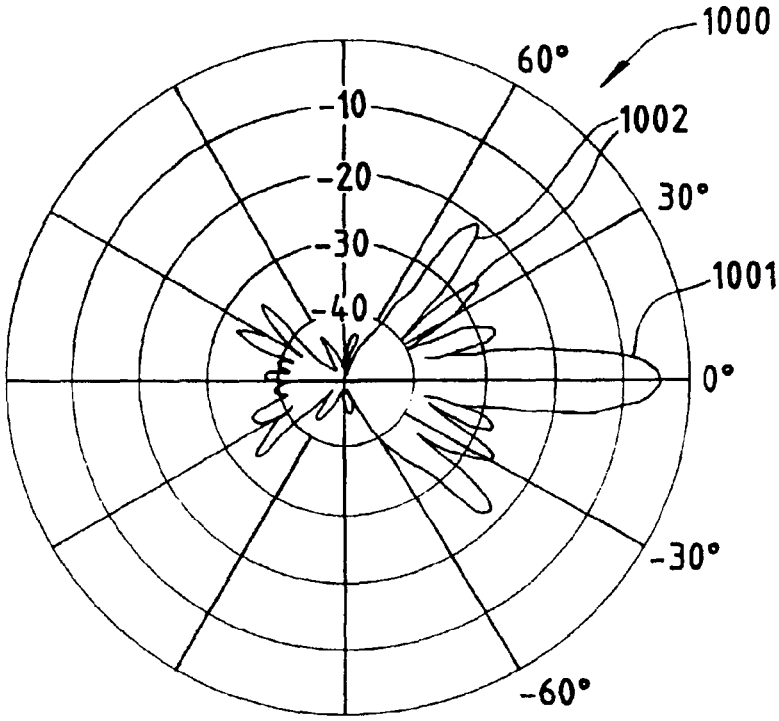
FIG. 10 is a vertical radiation pattern of the antenna assembly in accordance with the present invention.

The vertical radiation pattern 1000, illustrated in FIG. 10, has a main lobe 1001 with a main lobe axis coincident with the 0 degree reference line. The illustrated pattern 1000 has a downtilt angle of 0 degrees because that is the angle that the main lobe axis makes with the 0 degree reference line.

The radiation pattern 1000 can be tilted down with respect to the earth's surface (the 0 degree reference line) by feeding the individual antennas 101-105 slightly out of phase with one another. In order to avoid significant side lobe (1001, 1002, for example) distortion in the radiation pattern 1000, the phase shift is ordinarily made progressive. In other words, one of the antennas or antenna groups in the antenna assembly 100 (the first antenna group 115, in the preferred embodiment) is chosen as the reference group for phase purposes.

The RF signal applied to the next antenna 102 is then phase shifted by some amount X with respect to the reference antenna 101. The RF signal applied to the third antenna 103 is phase shifted by X degrees with respect to the second antenna 102 (2X degrees with respect to the first antenna 101). This progressive phase shift is continued for all of the antennas 101-105 in the antenna assembly 100.

For the antenna assembly 100 of the present invention, with the phase adjustment mechanism 108 positioned at its mid-point, the progressive phase shift is approximately equal to one inch (each of the transmission paths to the individual antennas differs in electrical length, at the design operating frequency, by one inch, resulting in a phase shift of about 30 degrees at the operating frequency) and the vertical pattern tilts down five degrees.

FIG. 11 illustrates schematically the way in which the progressive phase shift is implemented with the phase adjustment mechanism 108 set at mid-range 1101. As described above, an antenna feeder cable 1109 couples a first end of the semicircular, air-substrated transmission line section 305 of the phase adjustment mechanism 108 to a first antenna group 115, which comprises a single antenna 101 in the preferred embodiment.

The overall electrical path length, measured from the output of power divider 113, where the input signal splits, to the point where the antenna cable 1109 couples to the first antenna 101, is approximately 20 inches, with the phase adjustment mechanism 305 at its mid-point 1101. This means, of course, that approximately one-half of the semicircular, air-substrated transmission line section 305 is included in the electrical path length for antennas of the first antenna group 115 and antennas of the third antenna group 117.

Similarly, the overall electrical path length from the divider 113 output point to the second antenna 102 is 21 inches, to the third antenna 103 is 22 inches, to the fourth antenna 104 is 23 inches, and to the fifth antenna 105 is 24 inches, all with the phase adjustment mechanism 108 set at its mid-point 1101.

Thus, with the phase adjustment mechanism 108 set at its mid-point 1101, a true progressive phase shift of approximately 30 degrees has been established between the antennas 101-105 of the antenna assembly. With the phase adjustment mechanism 108 set at this mid-point 1101 position, the radiation pattern of the antenna exhibits a 5 degree downtilt as illustrated in FIG. 12.

Figure 12:
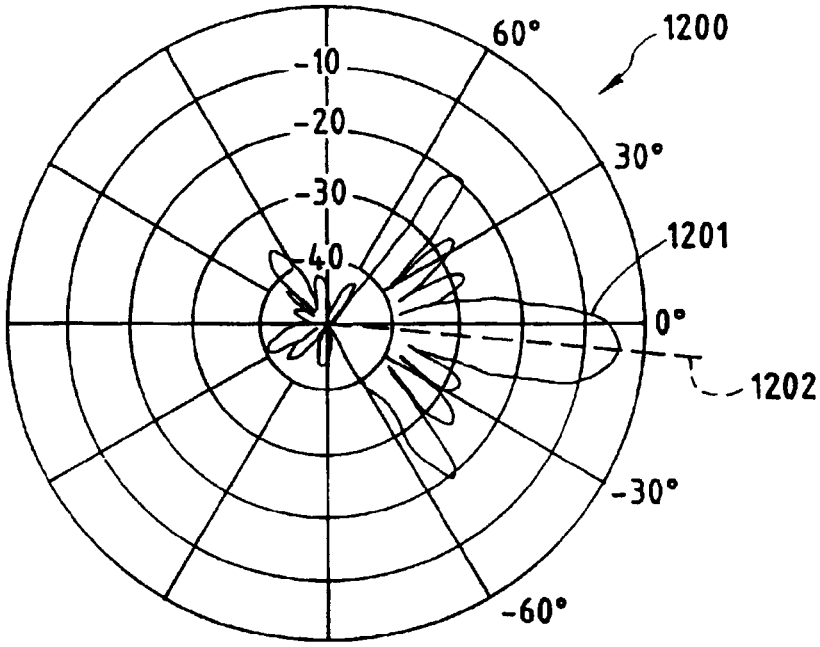
FIG. 12 is a further vertical radiation pattern of the antenna assembly of FIG. 1.

FIG. 12 shows the vertical radiation pattern 1200 of the antenna assembly 100 with the phase adjustment mechanism set at its mid-point 1101. The axis 1202 of the main lobe 1201 is now coincident with the −7 degree reference line, indicating that the main lobe axis is now tilted down 7 degrees with respect to the earth's surface.

Moving the phase adjustment mechanism to its maximum downtilt position 1112 shortens the effective electrical path lengths from the phase adjustment mechanism input point 1103 to the first antenna group 115, while lengthening the paths to the antennas 104-105 of the third antenna group 117. Of course, since the second antenna group is not fed through the phase adjustment mechanism, the path length to the second antenna group does not change.

In the preferred embodiment, the effective electrical path length to the first antenna group 101 is now about 18 inches, to the fourth antenna 104 about 25 inches, and to the fifth antenna 105 about 26 inches.

Figure 13:
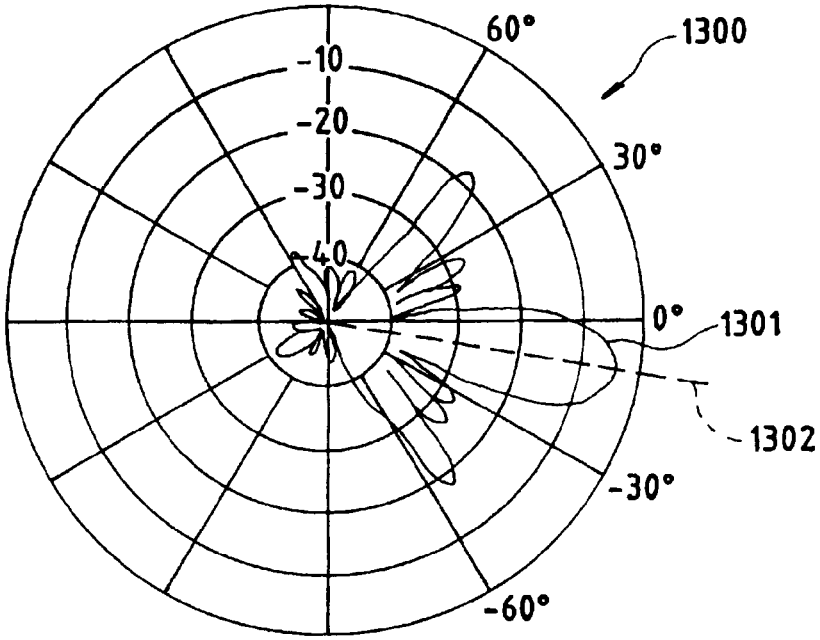
FIG. 13 is another vertical radiation pattern of the antenna assembly of FIG. 1.

The relative phase relationships induced as a result of these electrical path lengths causes a vertical radiation pattern downtilt of about 14 degrees, as shown in FIG. 13. As will be appreciated from an inspection of FIG. 13, the main lobe 1301 of the vertical radiation pattern 1300 now has an axis 1302 substantially coincident with the −14 degree reference line, indicating a vertical radiation pattern downtilt of 14 degrees.

With the phase adjustment mechanism set at its minimum downtilt position 1113, at least some of the phase relationships among the antennas of the first and second antenna groups 106, 107 are effectively reversed. The electrical path length to the first antenna 101 is now lengthened to 22 inches. The electrical path length to the fourth antenna is about 21 inches, and the path to the fifth antenna is about 22 inches.

The effect on the vertical radiation pattern of the antenna assembly 100 with the phase adjustment mechanism 108 set at this minimum downtilt position 1113 is to restore the downtilt angle to zero degrees, as illustrated in FIG. 10.

Figure 14:
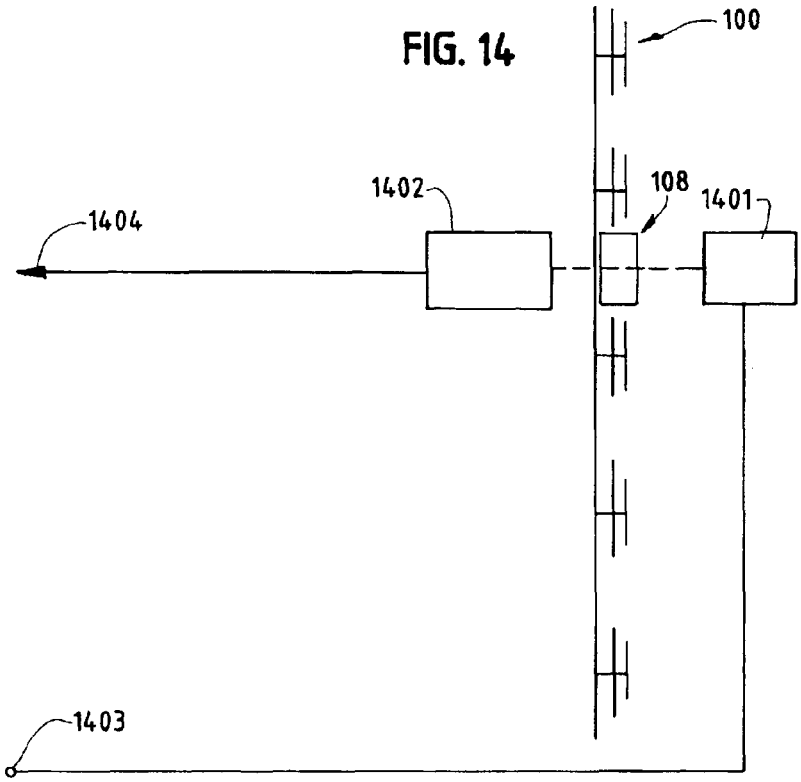
FIG. 14 is a schematic representation of a control system for use with the antenna assembly of FIG. 1.

Of course, adjusting the phase adjustment mechanism directly, by climbing an associated antenna support structure, would be nearly as inconvenient as adjusting the antenna mounting assembly to tilt the antenna. FIG. 14 depicts a remote control configuration for vertical radiation pattern downtilt adjustment.

With the antenna assembly 100 mounted in its normal operation position on a support structure, drive means, such as a drive mechanism 1401 is provided, mechanically connected to the movable coupling element of the phase adjustment mechanism 108. The drive mechanism may be an electric motor, a resolver or servomotor, a stepping motor, or any of a number of known positioning devices. Control inputs 1403 for the drive mechanism 1401 may be provided from a remote location, such as a maintenance facility of the local service provider.

Position information 1404 is provided to the remote location by a position detector 1402. The position detector may be implemented by Hall effect sensors, optical encoders, a synchro/servo system, or any of a number of other known position detection devices.

Figure 15:
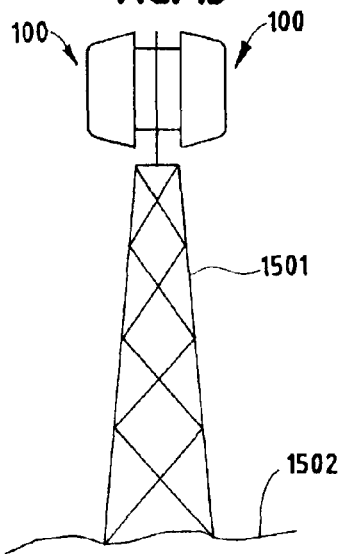
FIG. 15 depicts a plurality of antenna assemblies of FIG. 1 disposed on an antenna support structure.
Figure 16:
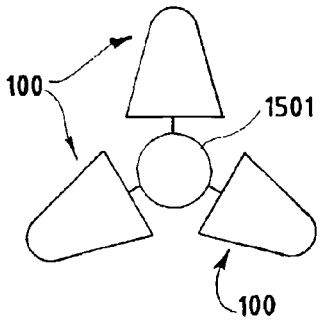
FIG. 16 is a top view of FIG. 15.

FIGS. 15 and 16 illustrate a plurality of antenna assemblies 100 (three) in accordance with the present invention supported in normal operating position by an antenna support structure 1501, such as a tower. The antenna assemblies 100 are positioned such that the longitudinal axis of each antenna assembly 100 is substantially perpendicular to the earth's surface 1502. Each assembly 100 is designed to cover a 120 degree sector of a cell and is adapted to be adjusted as described above.

There has been described herein an electrically variable beam tilt antenna that is relatively free from the shortcomings of prior art antenna systems. It will be apparent to those skilled in the art that modifications may be made without departing from the spirit and scope of the invention. Accordingly, it is not intended that the invention be limited except as may be necessary in view of the appended claims.

What is claimed is:

1. [An] *A base station array* antenna assembly having an operating frequency and a vertical radiation pattern with a main lobe axis defining a downtilt angle with respect to the earth's surface, the antenna assembly comprising:

a plurality of antenna means in first, second, and third antenna groups *physically* disposed along a backplane, the backplane having a longitudinal axis along which the antenna means are disposed;

*differential* phase adjustment means [disposed] *electrically connected on a path of transmission line means* between the [second] *first* and third antenna groups configured to simultaneously advance a phase angle of a signal to one of said [second] *first* and third antenna groups and delay the phase angle of said signal to the other of said [second] *first* and third antenna groups;

such that adjustment of the phase adjustment means results in variation of the vertical radiation pattern downtilt angle *between a first fixed position and a second fixed position;*

*said differential phase adjustment means including coupling means arcuately moveable along an arcuate section of said transmission line means to cause said simultaneous advance of a phase angle of a signal to one of said first and third antenna groups and a delay of the phase angle of said signal to the other of said first and third antenna groups*.

2. The antenna assembly of claim 1, wherein the second and third antenna groups each comprise a plurality of antenna means.

3. The antenna assembly of claim 2, wherein the first antenna group comprises one antenna means.

4. The antenna assembly of claim 2, wherein the second and third antenna groups each comprises two antenna means.

5. The antenna assembly of claim 2, wherein each of the antenna means comprises a log-periodic dipole array.

6. The antenna assembly of claim 5, wherein each of the log-periodic dipole array antennas comprises generally complementary front and rear dipole sections wherein one arm of each dipole is provided by the front dipole section, and the opposing arm of each dipole is provided by the rear dipole section.

7. The antenna assembly of claim 1, wherein the backplane is a plate of conductive material.

8. The antenna assembly of claim 1, wherein the backplane is substantially perpendicular to the earth's surface.

9. The antenna assembly of claim 1, wherein the phase adjustment means comprises:

input coupling means;

movable coupling means having a pivotally mounted first end electromagnetically coupled to the input coupling means; and transmission line means electromagnetically coupled to a second end of the movable coupling means.

10. The antenna assembly of claim 9, further comprising drive means coupled to the movable coupling element.

11. The antenna assembly of claim 10, wherein the drive means comprises an electric motor.

12. The antenna assembly of claim 10, wherein the drive means is operable from a remote location.

13. The antenna assembly of claim 12, wherein the drive means further includes means for transmitting position information relating to the phase adjustment means to the remote location.

14. The antenna assembly of claim 9, wherein the input coupling means comprises an input coupling element formed in a T-shape from a plate of conductive material, and the input coupling element is coupled to an antenna assembly cable.

15. The antenna assembly of claim 9, wherein the transmission line means comprises a semicircular, air-substrated transmission line section having opposing ends coupled to antenna feeder cables.

16. The antenna assembly of claim 15, wherein the antenna feeder cables are coupled to power dividers.

17. The antenna assembly of claim 16, wherein each of the power dividers is a microstrip transformer fabricated on a substrate of relatively low-loss dielectric material.

18. The antenna assembly of claim 16, further comprising a first power divider coupled to the input coupling element of the phase adjusting means and to a second power divider having a plurality of outputs, each output coupled to an antenna means of the second antenna group.

19. The antenna assembly of claim 18, wherein:

the phase adjustment means has a range of adjustment including a minimum downtilt position, a mid-point, and a maximum downtilt position; and electrical path lengths at the operating frequency, from the input coupling means to each of the antenna means, are selected to define a progressive phase shift between each of the antenna means such that, with the phase adjustment means set at its mid-point, the vertical radiation pattern downtilt angle is approximately 7 degrees.

20. The antenna assembly of claim 19, wherein the vertical radiation pattern downtilt angle is approximately zero degrees with the phase adjustment means set at the minimum downtilt position.

21. The antenna assembly of claim 19, wherein the vertical radiation pattern downtilt angle is approximately 14 degrees with the phase adjustment means set at the maximum downtilt position.

22. The antenna assembly of claim 1, wherein said antenna assembly further comprises an input coupling means, said phase adjustment means providing a continuously variable electrical path length between said input coupling means and said [second] *first* and third antenna groups.

23. The antenna assembly of claim 22 wherein said phase adjustment means comprises transmission line means having first and second ends, and movable coupling means adjustably coupling the input coupling means to the transmission line means, whereby adjustment of said movable coupling means simultaneously decreases the electrical path length between said input coupling means and one of the first and second ends of said transmission line means and increases the electrical path length between the input coupling means and the other of said first and second ends of said transmission line means.

24. [An] *A base station array* antenna assembly having an operating frequency and a vertical radiation pattern with a main lobe axis defining a downtilt angle with respect to the earth's surface, the antenna assembly comprising:

a plurality of antennas in first, second, and third antenna groups *physically* disposed along a backplane, the backplane having a longitudinal axis along which the antennas are disposed;

a phase adjustment mechanism [disposed] *electrically connected* between the [second] *first* and third antenna groups, the phase adjustment mechanism including:

an input coupling element;

a movable coupling section having a pivotally mounted first end electromagnetically coupled to the input coupling element; and a semicircular, air-substrated transmission line section electromagnetically coupled to a second end of the movable coupling section;

such that *pivotal position* adjustment of the phase adjustment mechanism results in variation of the vertical radiation pattern downtilt angle *between a first fixed position and a second fixed position*.

25. The antenna assembly of claim 24, further comprising a drive mechanism coupled to the movable coupling element.

26. The antenna assembly of claim 25, wherein the drive mechanism is an electric motor.

27. The antenna assembly of claim 25, wherein the drive mechanism is operable from a remote location.

28. The antenna assembly of claim 27, wherein the drive mechanism transmits position information relating to the phase adjustment mechanism to the remote location.

29. The antenna assembly of claim 24, wherein:

the phase adjustment mechanism has a range of adjustment including a minimum downtilt position, a mid-point, and a maximum downtilt position; and electrical path lengths at the operating frequency, from the input coupling element to each of the antennas, are selected to define a progressive phase shift between each of the antennas such that, with the phase adjustment mechanism set at its mid-point, the vertical radiation pattern downtilt angle is approximately 7 degrees.

30. The antenna assembly of claim 29, wherein the vertical radiation pattern downtilt angle is approximately zero degrees with the phase adjustment mechanism set at the minimum downtilt position.

31. The antenna assembly of claim 29, wherein the vertical radiation pattern downtilt angle is approximately 14 degrees with the phase adjustment mechanism set at the maximum downtilt position.

32. [An] *A base station array* antenna assembly having an operating frequency and a vertical radiation pattern with a main lobe axis defining a downtilt angle with respect to the earth's surface, the antenna assembly comprising:

a plurality of antennas in first, second, and third antenna groups *physically* disposed along a backplane, the backplane having a longitudinal axis along which the antennas are disposed;

a phase adjustment mechanism [disposed] *electrically connected* between the [second] *first* and third antenna groups, the phase adjustment mechanism including:

an input coupling element;

a movable coupling section having a pivotally mounted first end electromagnetically coupled to the input coupling element; and a semicircular, air-substrated transmission line section electromagnetically coupled to a second end of the movable coupling section;

the phase adjustment mechanism having a range of adjustment including a minimum downtilt position, a mid-point, and a maximum downtilt position;

a drive mechanism coupled to the movable coupling section;

electrical path lengths at the operating frequency, from the input coupling element to each of the antennas, are selected to define a progressive phase shift between each of the antennas such that, with the phase adjustment mechanism set at its mid-point, the vertical radiation pattern downtilt angle is approximately 7 degrees;

such that adjustment of the phase adjustment mechanism results in variation of the vertical radiation pattern downtilt angle.

33. The antenna assembly of claim 32, wherein the drive mechanism comprises an electric motor drive capable of activation from a remote location, and transmitting position information relating to the phase adjustment mechanism to the remote location.

*34. The antenna assembly of claim 1 wherein the coupling means is capacitively coupled to the transmission line means.*

*35. The antenna assembly of claim 1 wherein the coupling means includes a pivotally mounted, electrically conductive section.*

*36. The antenna assembly of claim 1 further comprising drive means coupled to the coupling means.*

*37. The antenna assembly of claim 36 wherein the drive means comprises an electric motor.*

*38. The antenna assembly of claim 36 wherein the drive means receives control inputs from a remote location.*

*39. The antenna assembly of claim 38 wherein the drive means further includes means configured to transmit position information relating to the phase adjustment means to the remote location.*

*40. The antenna assembly of claim 39 wherein said means configured to transmit position information includes a position detector.*

*41. The antenna assembly of claim 40 wherein said position detector comprises a Hall effect sensor, an optical encoder, a synchro servo system or other position detection device.*

*42. The antenna assembly of claim 36 wherein said drive mechanism is a resolver, or servomotor, or stepping motor or other electric motor, or other positioning device.*

*43. The antenna assembly of claim 1 wherein at least one of said antenna groups includes in a feed comprising a dielectric-substrated microstrip transformer.*

*44. The antenna assembly of claim 1 wherein said arcuate section of said transmission line means comprises an air-substrated metal conductor.*

*45. The antenna assembly of claim 24 wherein the second end of the movable coupling section is capacitively coupled to the transmission line section.*

*46. The antenna assembly of claim 24 wherein at least one of said antenna groups includes in a feed comprising a dielectric-substrated microstrip transformer.*

*47. The antenna assembly of claim 25 wherein said drive mechanism comprises a resolver, or servomotor or stepping motor or other electric motor, or other positioning device.*

*48. The antenna assembly of claim 28 wherein the drive mechanism includes a position detector.*

*49. The antenna assembly of claim 48 wherein said position detector comprises a Hall effect sensor, an optical encoder, a synchro servo system or other position detection device.*

*50. A plurality of antenna assemblies each as defined in claim 1, supported by a tower or other common support structure.*

*51. The assemblies of claim 50 designed such that each assembly covers a sector of a cell.*

*52. The assemblies of claim 51 comprising three in number, wherein each of the assemblies covers a 120 degree sector of a cell.*

*53. The assemblies of claim 50, wherein each assembly is coupled to a drive mechanism receiving control inputs provided from a remote location.*

*54. The assemblies of claim 53, wherein each assembly provides beam position information to the remote location.*

*55. The assemblies of claim 54, wherein the position information is provided in each assembly by a position detector.*

*56. The assemblies of claim 55 wherein the position detector comprises a Hall effect sensor, a synchro/servo system, or optical encoder.*

* * * * *